United States Patent [19]

Saaski et al.

[11] Patent Number: 4,933,545

[45] Date of Patent: * Jun. 12, 1990

[54] OPTICAL PRESSURE-SENSING SYSTEM USING OPTICAL RESONATOR CAVITY

[75] Inventors: Elric W. Saaski, Kirkland; Gordon L. Mitchell, Woodinville; James C. Hartl, Snohomish, all of Wash.

[73] Assignee: Metricor, Inc., Woodinville, Wash.

[*] Notice: The portion of the term of this patent subsequent to Jul. 7, 2006 has been disclaimed.

[21] Appl. No.: 815,355

[22] Filed: Dec. 30, 1985

[51] Int. Cl.$^5$ ............................................. H01J 5/16
[52] U.S. Cl. .......................... 250/227.14; 250/231.19; 73/705
[58] Field of Search ............... 250/227, 231 P, 231 R, 250/226; 73/705, 717, 722

[56] References Cited

U.S. PATENT DOCUMENTS

| | | | |
|---|---|---|---|
| Re. 31,879 | 5/1987 | Lübbers et al. | 436/133 |
| 3,466,565 | 9/1969 | Rigrod | 350/157 |
| 4,016,761 | 4/1977 | Rozzell et al. | 73/356 |
| 4,140,393 | 2/1979 | Cetas | 356/43 |
| 4,210,029 | 7/1980 | Porter | 73/705 |
| 4,249,076 | 2/1981 | Bergstrom et al. | 250/227 |
| 4,275,296 | 6/1981 | Adolfsson | 250/227 |
| 4,307,607 | 12/1981 | Saaski et al. | 73/356 |
| 4,316,388 | 2/1982 | Miller et al. | 73/356 |
| 4,329,058 | 5/1982 | James | 356/352 |
| 4,356,396 | 10/1982 | Ruell et al. | 250/227 |
| 4,367,040 | 1/1983 | Goto | 356/44 |
| 4,428,239 | 1/1984 | Johnston | 73/705 |
| 4,437,761 | 3/1984 | Kroger et al. | 356/44 |
| 4,446,366 | 5/1984 | Brogardh et al. | 250/227 |
| 4,487,206 | 12/1984 | Aagard | 128/667 |
| 4,498,004 | 2/1985 | Adolfsson et al. | 250/227 |
| 4,678,904 | 7/1987 | Saaski et al. | 250/231 P |
| 4,682,500 | 7/1987 | Uda | 250/231 P |

Primary Examiner—David C. Nelms
Assistant Examiner—Stephone B. Allen
Attorney, Agent, or Firm—Seed and Berry

[57] ABSTRACT

An optical pressure-sensing system in which an optical beam splitter couples input light from a light source to an optically resonant pressure sensor and couples output light reflected from the sensor to a light detector. The light detector may divide the output light into bands having different wavelengths and then take the ratio of the light in one band to the light in the other band in order to provide an output that is insensitive to various spurious responses in the system. The optical beam splitter may be formed by two pairs of graded refractive index lenses. A partially reflective, partially transmissive mirror is sandwiched between the lenses of one pair, while a dichroic mirror is sandwiched between the second pair. The pairs of lenses are placed in abutting relationship to each other. The optical beam splitter may also be formed by a block of transparent material having a partially reflective, partially transmissive mirror on one edge. The optical pressure sensor is formed by a transparent substrate having a cylindrical recess and a resilient diaphragm positioned over the recess to form an optically resonant cavity. Differential pressure may be sensed by placing a second substrate having a cylindrical recess over the side of the diaphragm opposite from the first substrate. The optical pressure sensor may be specifically adapted for use as a microphone by utilizing a relatively thick cavity having a pedestal projecting from the substrate close to the diaphragm to form an optically resonant cavity. The optical pressure sensor may also sense gas density by filling the optically resonant cavity with the gas being measured having a pressure at a predetermined density and temperature that matches the pressure of the gas being measured at that same density and temperature.

45 Claims, 6 Drawing Sheets

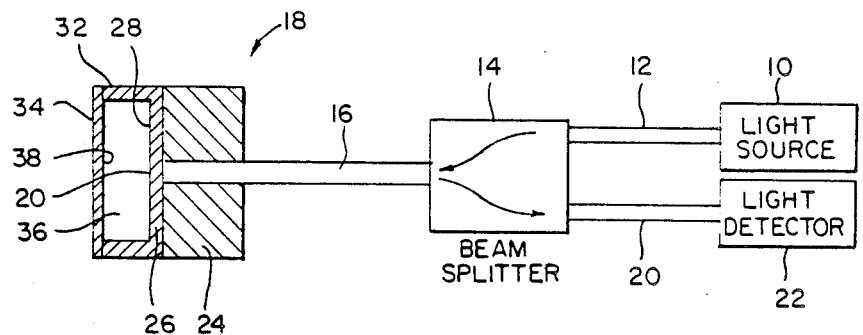
FIG. 1
FIG. 2
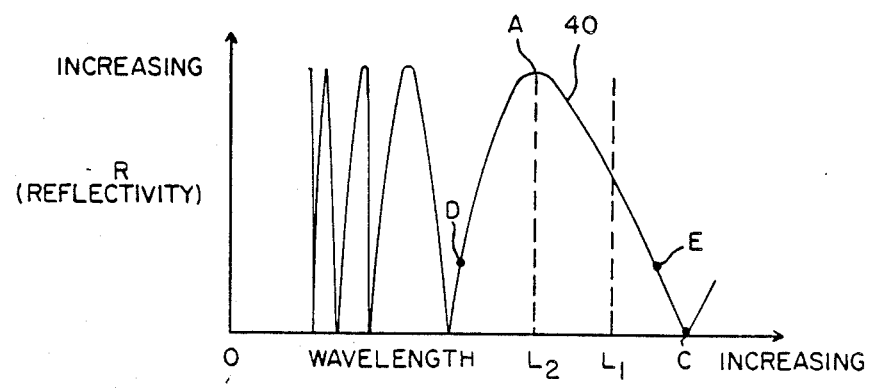
FIG. 3
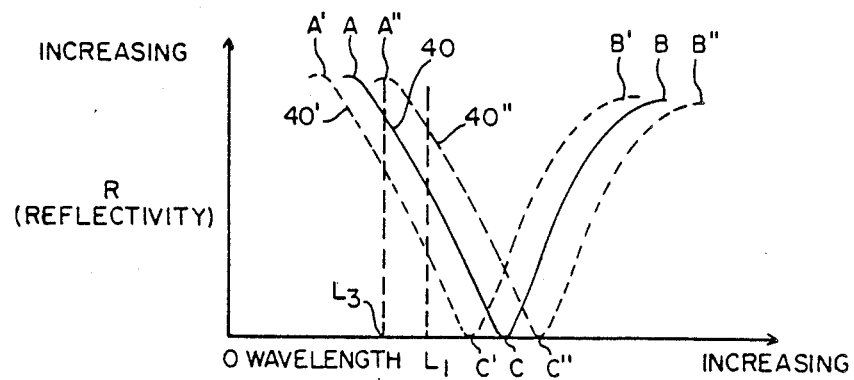

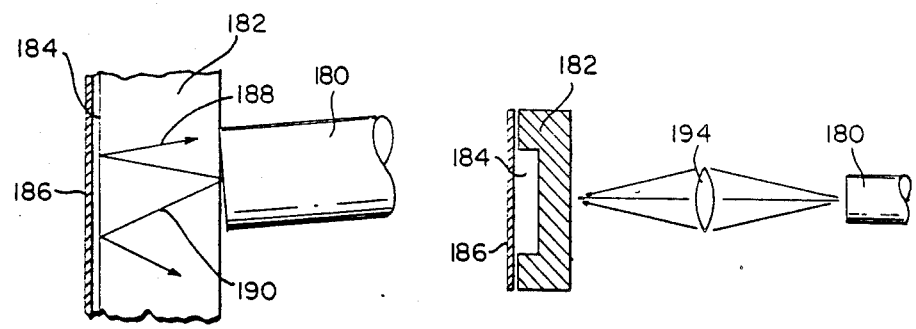
FIG. 12
FIG. 13
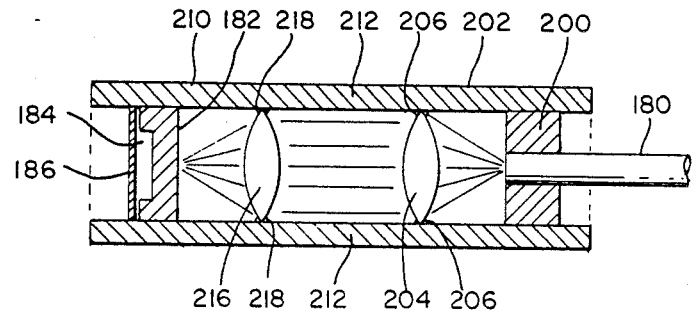
FIG. 14
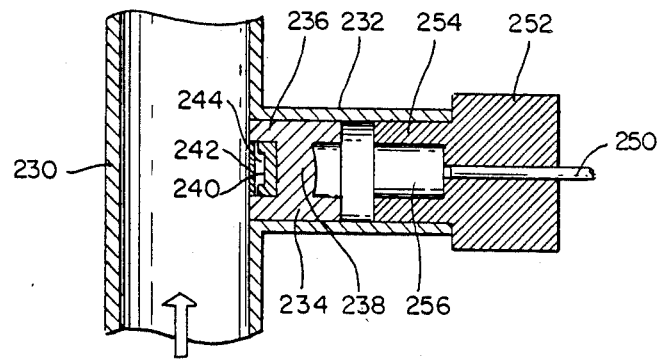
FIG. 15

OPTICAL PRESSURE-SENSING SYSTEM USING OPTICAL RESONATOR CAVITY

DESCRIPTION

1. Technical Field

This invention relates to optical pressure sensors and, more particularly, to use of optical pressure sensors for microphones, differential pressure measurements, and gas density measurements, as well as structures for mounting and combining such sensors in a unitary system.

2. Background Art

A wide variety of physical parameters, such as pressure and gas density, are measured with electronic sensors. Although electronic sensors are satisfactory for most applications, there are many applications that preclude the use of such sensors. For example, electronic pressure sensors often cannot be used in the presence of electromagnetic interference (EMI) since the EMI will generate large voltages on either the components of the sensor or the wires connecting the sensor to an external device. Many electronic devices for sensing physical parameters are incapable of providing satisfactory results in the presence of high magnetic fields, such as, for example, would be found adjacent transformers, motors and the like. Other electronic devices for sensing a physical parameter are effected by variations in other physical parameters. For example, some electronic gas density sensors are, in reality, electronic pressure sensors since pressure is proportional to gas density for a given temperature or volume. However, the accuracy of such sensors is greatly degraded by variations in temperature or changes in the volume of the container for such gas.

In order to solve these and other problems associated with electronic sensors, various optical devices for sensing physical parameters such as pressure have been devised. For example, U.S. Pat. No. 4,487,206, to Aagard, describes a pressure sensor in which light is reflected from one fiberoptic waveguide to another by a reflective diaphragm. The amount of light reflected is a function of the shape of the reflective diaphragm, which varies in accordance with pressure. Similarly, U.S. Pat. No. 4,210,029, to Porter, discloses a differential pressure sensor in which light is reflected from one optical waveguide to another by a reflector mounted on a flexible membrane. The amount of light reflected from one waveguide to the other is a function of the position of the reflector, which is controlled by the applied pressure. U.S. Pat. No. 4,428,239, to Johnston, discloses a differential pressure sensor in which light from a common source is reflected from opposite sides of a diaphragm which deflects as a function of the differential pressure across the diaphragm. The interference between the light reflected from opposite sides of the diaphragm is detected and used to indicate the differential pressure across the diaphragm.

Fiberoptic pressure transducers have also been devised which can measure the absolute pressure at two points using separate sensors. The differential or relative pressure at these two points can then be calculated by comparing the output of the two sensors in a difference circuit. In many cases, this scheme is not satisfactory because of sensor drift or the problem of exceptional bulk in the cable because of the need to connect several transducers to the difference circuit. Further, in some applications, where size constraints exist, such as monitoring the pressure in the heart and other organs, it is desirable to have a single, compact sensor for measuring differential pressure.

Other optical devices for measuring physical parameters provide inadequate performance because they backscatter scatter excessive light at the interfaces between the fiberoptic waveguide and other components.

DISCLOSURE OF INVENTION

It is an object of the invention to provide an optical pressure sensor that is capable of accurately measuring differential pressure using a single fiberoptic waveguide extending from the sensor.

It is another object of the invention to provide an optical differential pressure sensor that receives differential pressures through fluid conduits that may be manufactured with relative ease and which does not interfere with the deflection of a differential pressure responsive diaphragm.

It is another object of the invention to provide an optical pressure sensor that can be used as an audio microphone.

It is still another object of the invention to provide an optical pressure sensor that can be used to measure gas density and that is internally self-compensating for temperature variations.

It is a still further object of the invention to provide an interconnecting system for optical pressure sensors that minimizes errors resulting from backscattering and that allows several such pressure sensors to be combined.

BRIEF DESCRIPTION OF THE DRAWINGS

FIG. 1 is a schematic showing an optical pressure-sensing system.

FIG. 2 is a graph showing the reflectivity of the pressure sensor used in the system of FIG. 1 as a function of the wavelength of light applied to the sensor.

FIG. 3 is a graph of the reflectivity of the pressure sensor of FIG. 1 for various resonant wavelengths of the pressure sensor.

FIG. 12 is a cross-sectional view of an optical pressure sensor mounted for measuring the pressure of fluid in a pipe and in optical communication through a removable coupling.

FIG. 13 is a schematic showing the manner in which light losses occur because of misalignments in a fiberoptic waveguide and a light-reflecting surface.

FIG. 14 is a schematic showing the use of a lens to prevent light losses resulting from misalignments of a fiberoptic waveguide and a reflective pressure sensor.

FIG. 15 is a cross-sectional view of an optical pressure sensor mounted in a releasable, low-loss coupling.

BEST MODE FOR CARRYING OUT THE INVENTION

Figure 4:
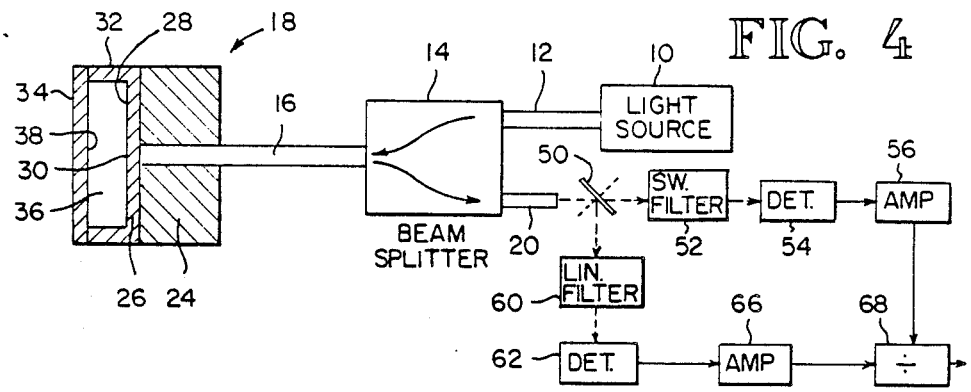
FIG. 4 is a schematic of a pressure-sensing system utilizing a ratiometric light-detection technique.

The basic concept of an optical pressure-sensing system is illustrated in FIG. 1. Basically, a light source 10 generates input light which either may be monochromatic or may be composed of a range of wavelengths falling within one or more color bands. More specifically, the light source 10 may be a laser or light-emitting diode (LED) and it may emit light having a wavelength of 810 nm.

Input light from the light source 10 is coupled through a first fiberoptic waveguide 12 of conventional design to a first input port of a beam splitter 14, described in greater detail below. A second fiberoptic waveguide 16 extends from a second port of the beam splitter 14. The beam splitter 14 functions to couple light from the first fiberoptic waveguide 12 at the first port of the beam splitter 14 into the second fiberoptic waveguide 16 through the second port of the beam splitter 14. Light conveyed through the fiberoptic waveguide 16 then reaches pressure sensor 18, described in detail below. Basically, pressure sensor 18 modifies the spectrum of light incident on the sensor 18 and reflects back the spectrally modulated light. For example, the pressure sensor may increase input light at one wavelength with respect to light at another wavelength. The spectrally modulated light reflected from the pressure sensor 18 is then coupled to the second port of the beam splitter 14 through fiberoptic waveguide 16. Beam splitter 14 then functions to couple the reflected light to a third fiberoptic waveguide 20 through a third port of the beam splitter 14. The reflected light coupled through fiberoptic waveguide 20 is then sensed by a light detector 22, which may be, for example, a conventional photodetector.

The optical pressure sensor 18 may include a support 24 through which the fiberoptic waveguide 16 extends. The support 24 carries a substrate 26 consisting of a base 28 having a planar surface 30 surrounded by sidewalls 32. The base 28 is preferably circular and the sidewalls 32 are preferably cylindrical. A resilient diaphragm 34 is bonded to the edges of the sidewalls 32 to form an airtight cavity 36. Alternatively, the sidewalls 32 may be integrally formed with the diaphragm 34, and the sidewall 32 may be bonded to the substrate 26. The inside surface 38 of the diaphragm 34 is planar and it is parallel to the planar inside surface 30 of the base 28. The thickness of the airtight cavity 26 (i.e., the distance between the inside surface 30 of the base 28 and the inside surface 38 of the diaphragm 34) is selected so that the input light incident through fiberoptic waveguide 16 resonates in the cavity 36. Cavity 36 thus forms an airtight optical resonator. As is well understood in the art, the resonant frequency of the cavity 36 is dependent upon the thickness of the cavity 36. Thus, deflecting the diaphragm 34 inwardly or outwardly alters the thickness of the cavity 36 and hence its resonant frequency. The diaphragm 34 is formed by a resilient material so that it deforms inwardly when the external pressure is greater than the pressure in the cavity 36. Diaphragm 34 deflects outwardly when the external pressure is less than the pressure in the cavity 36. The theory of operation of the pressure sensor is described in greater detail below.

In order to maximize the spectral modulation, the inside surface 30 of the base 28 is preferably provided with a partially light-transmissive, partially reflective coating, while the inside surface 38 of the diaphragm 34 is provided with a reflective coating.

The theory of operation of the optical pressure-sensing system depends upon the characteristics of the reflectivity curves of the sensor 18 in response to input light. Basically, the reflectivity curve undergoes a shift, known as a "microshift," when the resonant frequency of the cavity 36 shifts responsive to small pressure-induced deformations of the diaphragm 34. The reflectivity (R) of the optically resonant cavity 36 is given by the equation:

$$R = 1 - s^2/((1-r)^2 + 4r \sin^2(\text{theta}))$$

where $s = (s_1 s_2)^{0.5}$ and $r = (r_1 r_2)^{0.5}$. The quantities $s_1$, $s_2$ are, respectively, the transmittances of reflective surfaces 30, 38, while $r_1$, $r_2$ are, respectively, the reflectances of reflective surfaces 30, 38 as seen from within the cavity 36.

The angle theta in the sine term in the above equation is known to be given by:

$$\text{theta} = 2(\text{pi}) nt \cos(\text{phi})/\text{lambda} + e$$

where:
n = the refractive index of whatever is in the cavity 36 between reflective surfaces 30, 38;
t = the distance between reflective surfaces 30, 38;
phi = the angle of light reflection between reflective surfaces 30, 38;
lambda = the wavelength of input light incident in optically resonant cavity 36; and
e = any phase shift caused by reflection from either reflective surface 30, 38.

A typical reflectivity curve 40 is illustrated in FIG. 2. The reflectivity R is a periodic function of the wavelength of the input light, as can be seen by examining the equation set forth above. Specifically, it can be seen that the reflectivity R is a periodic function of the parameter group nt cos (phi)/lambda. The maximum reflectivities thus occur at nt cos (phi)/lambda=(2m+1)/4, while the minimum reflectivities occur at nt cos (phi)/lambda=m/2; where m is the cycle number and is 0 or a positive integer. It is thus seen that adjacent maxima and minima are separated from each other by exactly one-quarter of the parameter group nt cos (phi)/lambda. Insofar as the thickness T of the cavity 36 varies according to the differential pressure across the diaphragm 34, it can be seen that the parameter group nt cos (phi)/- lambda will vary in accordance with the applied pressure.

FIG. 3 illustrates the microshift of the reflectivity curve 40 to positions 40' and 40" responsive to variations in the thickness T of the cavity 36. In particular, the reflectivity curve 40 shifts to the left with respect to the wavelength $L_1$ of input light from light source 10 to the reflectivity curve 40' when the thickness T of the cavity 36 is reduced responsive to increases in the external pressure. Similarly, the reflectivity curve 40 is shifted to the right with respect to the wavelength $L_1$ to become reflectivity curve 40" when the thickness T of the cavity 36 increases responsive to decreases in the external pressure. The distance between adjacent maxima or adjacent minima is termed a "cycle length." It will be apparent from an examination of FIG. 3 that a given value of reflectivity will occur at two points for each cycle of the reflectivity curve. Thus, in order to achieve a unique reflectivity for a given pressure, the optical pressure sensor must be kept within a range or "operating segment" of one-half resonance cycle extending between an adjacent maxima and minima. For example, curve A-C and C-B each constitute an operating segment in one resonance cycle of reflectivity curve 40.

Assuming that the light source 10 emits input light having a wavelength $L_1$, it will be apparent that when the reflectance curve 40 shifts to the position 40' responsive to a decrease in external pressure, the amplitude of the spectrally modulated input light received at light detector 22 will decrease. Similarly, when the reflectivity curve 40 microshifts to the position 40" responsive to decreases in the external pressure, the amplitude of the spectrally modulated light sensed at detector 22 will increase. As mentioned above, light detector 22 may be a variety of light-sensitive devices, such as a photodetector, which, when connected in known circuits, may produce an electrical output having a magnitude that is proportional to the intensity of the incident light. Thus, the light detector 22 may produce a voltage that is proportional to the pressure external to the cavity 26.

Although the embodiment illustrated in FIG. 1 will produce an output that is proportional to the external pressure, it suffers from a number of potential limitations because the intensity of the output light applied to the light detector 22 may vary for reasons other than microshifts of the reflectivity curve 40. For example, the intensity of the light received by the light detector 22 will vary in accordance with variations in the intensity of the input light generated by the light source 10. Also, variations in the losses and leakages in the fiberoptic waveguides 12, 16, 20 will result in variations in the light at the light detector 22. For these reasons, a ratiometric system, illustrated in FIG. 4, may be used as the light detector 22. In the ratiometric system, output light from the beam splitter 14 and waveguide 20 is incident on a second beam splitter 50, which passes a portion of the incident light to a short-pass optical filter 52. The short-pass optical filter 52 preferentially transmits light having a wavelength that is shorter than a predetermined wavelength. The shorter wavelength light from filter 52 is converted to a first electrical signal by a light detector 54, which may be a conventional photodetector circuit. The output of the light detector 54 is then boosted by amplifier 56.

The portion of the light reflected by beam splitter 50 is incident on a long-pass optical filter 60. The long-pass optical filter 60 preferentially transmits light having a wavelength longer than a predetermined value. The long wavelength light passing through filters 60 is converted to a second electrical signal by a light detector 62. The output of the light detector 62 is then boosted by an amplifier 66.

The amplified first and second electrical signals from amplifier 56, 66, respectively, are applied to a conventional divider circuit 68. Divider circuit 68 generates an output that is proportional to the ratio of the amplitude of the signal of the output of amplifier 56 to the amplitude of the signal at the output of amplifier 66. As explained in greater detail below, the output of the divider circuit 68 is an electrical signal that is proportional to the pressure measured by the pressure sensor 18. It will be apparent that any variations in the intensity of the light from the light source 10 as well as variations in the losses or leakage in the fiberoptic waveguides 12, 16, 20 will result in equal variations in the light at both light detectors 54, 62. As a result, the output of the divider circuit 68 is unaffected by such variations.

Figure 5:
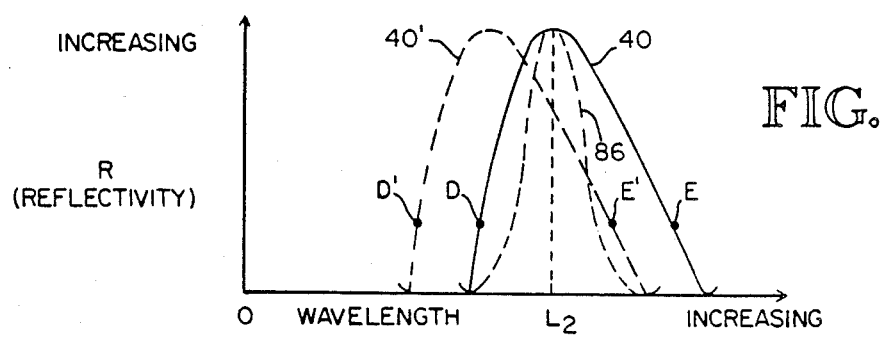
FIG. 5 is a graph of the reflectivity curve of the pressure sensor used in the system of FIG. 4 for two different resonant wavelengths of the sensor plotted against the frequency spectrum of the light incident on the pressure sensor.
Figure 6:
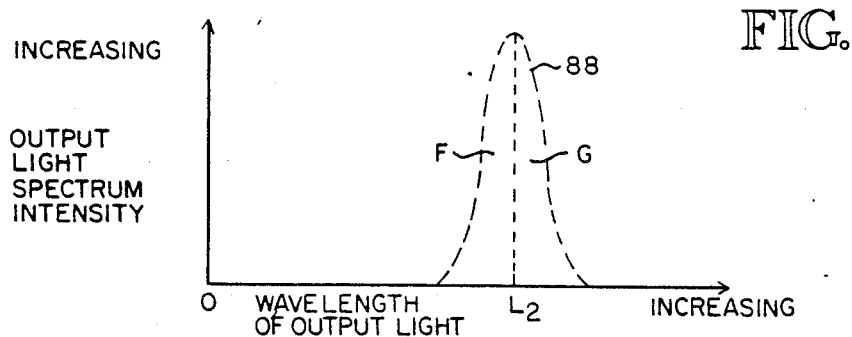
FIG. 6 is a graph showing the spectrum of light reflected from the pressure sensor when the spectrum of the incident light is symmetrically positioned about the resonant wavelength of the pressure sensor.

The embodiment illustrated in FIG. 4 must utilize a light source 10 that emits input light having either at least two wavelengths or a range of wavelengths. In contrast, the light source 10 of the embodiment of FIG. 1, preferably emits light having a single or relatively narrow band of wavelengths. The frequency spectrum of one such light source 10 is illustrated in FIG. 5 as curve 86. Also illustrated in FIG. 5 is a portion of the reflectivity curve 40, which is selected to have a resonant wavelength or maxima coinciding with the wavelength of the highest intensity light from the light source 10. However, it will be understood that the resonant wavelength of the cavity 36 and the wavelength of highest intensity from the light source 10 need not coincide. When the resonant wavelength coincides with the wavelength of maximum intensity from the light source 10, the output light incident on the beam splitter 50 will have the spectrum illustrated in FIG. 6. Since the light having wavelengths longer than wavelength $L_2$ is modified by the reflective curve 40 to the same extent as the light having a wavelength shorter than the wavelength $L_2$, the spectrum of light incident on the beam splitter 50 is symmetrical about wavelength $L_2$, as illustrated in FIG. 6. If the cutoff wavelength of the short wavelength filter 52 and the long wavelength filter 60 are selected at $L_2$, the output from light detector 54 will have an amplitude equal to the area F, while the output of light detector 66 will have an amplitude equal to the area G. Under these circumstances, the output of the divider circuit 68 will be unity. A similar result will be achieved even if the cutoff wavelengths for the filters 52, 60 do not coincide, as long as the filters 52, 60 preferentially pass some wavelengths of the light from light source 10 to a greater degree than other wavelengths.

In the event that the pressure measured by the pressure sensor 18 increases, the reflectivity curve illustrated in FIG. 5 will shift from the position 40 to the position 40'. The spectrum 86 of the light from the light source 10 will thus be altered to the spectrum illustrated in FIG. 7. In other words, since the reflectivity curve 40 has shifted to the position 40', light having a wavelength shorter than $L_2$ is reflected to a degree greater than the reflection of light having wavelengths greater than a wavelength $L_2$. As in the example given above, light having a wavelength shorter than $L_2$ is preferentially applied through short wavelength filter 52 to the light detector 54. The output of light detector 54 will thus have an amplitude corresponding to the area H. Light having a wavelength greater than $l_2$ is preferentially applied through long wavelength filter 60 to light detector 62 so that light detector 62 generates an output having an amplitude corresponding to the area I. As a result, the output of divider circuit 68 will be equal to the ratio of area H to area I.

Figure 7:
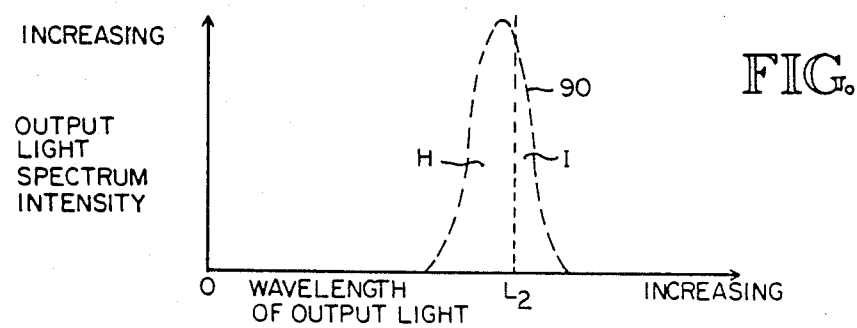
FIG. 7 is a graph of the spectrum of the light reflected from the pressure sensor when the incident light is centered at a wavelength that is larger than the resonant frequency of the pressure sensor.

It can be noted from examining FIGS. 5–7 that the embodiment of FIG. 4 will operate for microshifts of up to plus or minus one-half operating cycle. The total operating segment of the embodiment of FIG. 4 is thus a complete operating cycle, in contrast to the one-half resonance cycle operating segment of the embodiment of FIG. 1. The embodiment of FIG. 4 thus not only cancels out spurious variations in the detected light, but it also has a greater dynamic range.

Figures 8, 9:
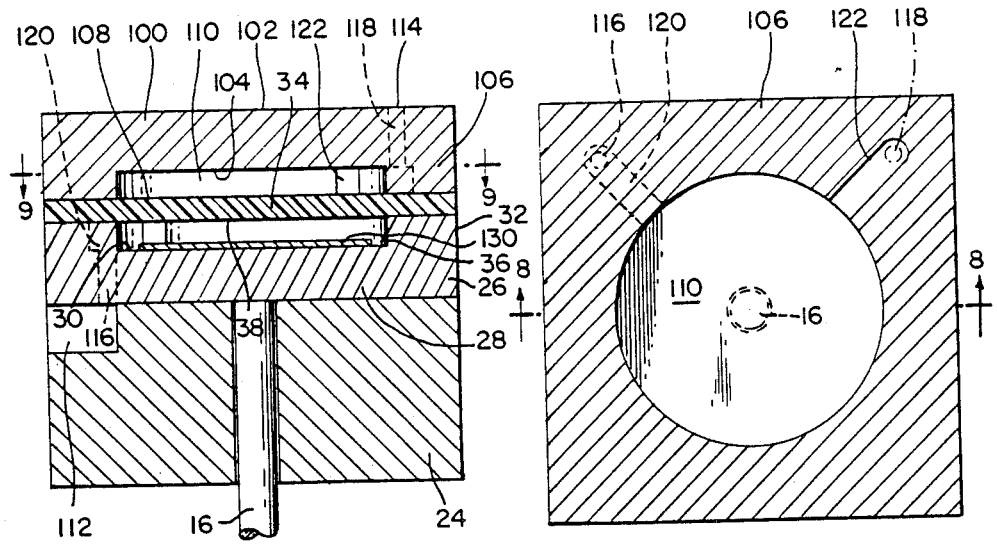
FIG. 8 is a cross-sectional view of an optical, differential pressure sensor.
FIG. 9 is a cross-sectional view taken along the line 9—9 of FIG. 8.

Another embodiment of a pressure sensor is illustrated in FIGS. 8 and 9. Components of this embodiment that are found in the embodiment of FIG. 1 are given identical reference numerals for clarity of explanation. Thus, in the embodiment of FIGS. 8 and 9, the fiberoptic waveguide 16 extends through support 24 and terminates at a substrate 26 having a base 28 with a planar inner surface 30 surrounded by sidewalls 12. As in the embodiment of FIG. 1, a resilient diaphragm 34 having a planar inner surface 38 is secured to the sidewalls 32 to form an airtight cavity 36. As explained to this point, the embodiment of FIG. 8 is identical to the embodiment of FIG. 1.

The embodiment of FIG. 8 is specifically adapted to measure differential pressure. Accordingly, it includes a second substrate 100 having a base 102 with an inside surface 104 that, unlike the inner surface 300 of substrate 26, need not be planar. Sidewalls 106 are secured to the surface 108 of the diaphragm 34 to form an airtight cavity.

With reference also, now, to FIG. 9, the airtight, optically resonant cavities 36, 110 communicate with respective pressure ports 112, 114 through respective fluid conduits 116, 118. While the routing of a fluid conduit from the cavities 36, 110 to respective pressure ports 112, 114 might seem relatively straightforward, care must be taken to prevent the fluid conduits from affecting either the deflection characteristics of the diaphragm 34 or the optical properties of the cavities 36, 110 and the substrate 26. Additionally, because the cavities 36, 110 are extremely thin, i.e., on the order of one micron, it is difficult to fabricate fluid passages to the cavities 36, 110 without adversely affecting the operation of the sensor. However, these problems can be overcome by forming a radial projection or arm 120, 122 integrally with each of the cavities 36, 110, respectively. When the diaphragm 34 is secured to the sidewalls 32, 106 of the substrates 26, 100, respectively, the radial projections 120, 122 are sealed from the external environment. It is then a relatively simple matter to bore or otherwise form holes 116, 118 in the respective substrates 28, 100 that extend from the respective pressure ports 112, 114 to the projections 120, 122.

In operation, the deflection of the diaphragm 34 is determined by the differential pressure on opposite sides of the diaphragm 34 in the cavities 36, 110. Thus, when the pressure in cavity 36 is greater than the pressure in cavity 110, the diaphragm 34 bows outwardly away from the fiberoptic waveguide 16. When the pressure in the cavity 36 is less than the pressure in the cavity 110, the diaphragm 34 bows inwardly toward the fiberoptic waveguide 16. As in the embodiment of FIG. 1, deflection of the diaphragm 34 causes microshifts in the reflectivity curve from the sensor. In order to maximize the sensitivity of the sensor, the planar inside surface 30 of the substrate 28 is preferably coated with a partially reflective, partially light-transmissive mirror and the surface 38 of the diaphragm 34 is coated with a reflective material. In order to prevent light from being reflected into the fiberoptic waveguide 16 from the inside surface 104 of the substrate 100, the surface 104 is made non-reflective through one of a variety of techniques. For example, the surface 104 may be roughened (as shown), or it may be provided with a light-absorptive surface. Since the second airtight cavity 110 does not function as an optical resonator, it is not necessary for the surface 104 to be planar.

One highly advantageous feature of the differential pressure sensor is that it requires only a single fiberoptic waveguide 16 extending to the sensor. Conventional prior art sensors utilize a pair of fiberoptic waveguides extending to the sensor which make the sensor more bulky and thus less useful in certain applications, such as internally monitoring blood pressure. The use of two fiberoptic waveguides also requires additional components to process the light coupled through both fiberoptic waveguides.

The optical differential pressure sensor illustrated in FIGS. 7 and 8 may be fabricated using a variety of techniques. However, the small thickness of the cavities 36, 110, both in absolute terms and in relation to the diameter of the diaphragm 34, presents special fabrication problems that must be dealt with. Normally, the cavities 36, 110 will have a thickness of about 1 micrometer while the diameter of the cavities 36, 110 will be about 200–1,000 micrometers. Conventional techniques for bonding using glue cannot be used to secure the diaphragm 34 to the substrates 28, 100 because the high capillary pressure in the cavities 36, 110 draws glue into the cavities. Furthermore, the bond between the sidewalls 32, 106 and the diaphragm 34 should preferably be as strong as the materials themselves. It has been found that an ionic bond, such as an anodic bonding technique, may be used when the diaphragm 34 is made of silicon and the substrates 28, 110 are of a compatible glass-like material.

Although the pressure sensors may be fabricated using a variety of manufacturing techniques, one specific manufacturing technique is described below. The starting point is a glass wafer 0.011±0.001 inch thick of fused silica or a low-expansion glass such as Corning #7740. Both surfaces of the wafer are ground and polished to an optical finish. The glass wafer will form the substrates 26 of the sensors 18.

The surfaces of the glass wafer are first cleaned by washing the glass wafer in hot, soapy water; rinsing it with clean water; etching and polishing it for one minute in a buffered HF solution composed of four parts of a mixture of 3 ml water and 2 g of $NH_4F$ plus one part 48% HF solution; rinsing it again; and then baking it at 300° C. for one-half hour.

Using a conventional vacuum deposition process, a layer of chrome 200 Angstroms thick is then deposited on the glass wafer. This chrome provides a good adhesion surface for the subsequent application of photoresist to the glass wafer.

Photoresist, such as Microposit 1400-27 photoresist made by the Shipley Company, located in Newton, Mass., is then spin-coated on the chrome surface of the glass wafer at 3000 rpm; after which the coated glass wafer is baked at 90° C. for one-half hour.

Using conventional techniques, a photoresist mask is then prepared having an array of circles of a diameter equal to the desired diameter of the cavity 36, for example, 200 microns. The mask is aligned with the photoresist-coated surface of the glass wafer; and the mask and glass wafer assembly is then exposed. The exposed coated glass wafer is then developed with photoresist developer, such as Microdeposit 35ICD-23 developer, made by the Shipley Company; rinsed in water; and dried.

As a result, unprotected circles 200 microns in diameter in the photoresist are left on the glass wafer. The chrome within the unprotected circles in the photoresist is lifted off with a chrome etch solution composed of one part HCL and one part glycerine, leaving circles of unprotected glass 200 microns in diameter on the surface of the glass wafer.

The circles of unprotected glass on the glass wafer are then etched for about 20 minutes at 69° F. with said buffered HF solution to produce the cavity 36 in the substrate 26, which may be 1.27 microns deep. Even though the planar surface 30 of the substrate 26 is formed by chemical etching, it is still flat enough to form an adequate reflective surface 30 for the sensor's optically resonant cavity 36.

Using conventional vacuum deposition techniques, a layer of titanium dioxide 200 Angstroms thick is then deposited on the surface 30 of each cavity 36 to increase the reflectivity of the surface 30. This increases the intensity of the modulation of the output light of the sensor 18. The remaining photoresist is then removed with acetone, and the chrome on the glass wafer is then removed with the chrome etch solution. Finally, the glass wafer is washed in water and air dried.

When the pressure sensor 18 is to be used for measuring absolute pressure, the cavity 36 must be evacuated. Although there are many ways in which the cavity 36 can be evacuated, it is preferred to use a getter structure in the form of a ring of deposited layers of chrome and iron in the bottom of each cavity 36 to absorb residual gases or subsequent outgassing in cavity 36 after the initial evacuation of cavity 26 is performed.

The getter rings for cavity 36 in the glass wafer is prepared by first baking the glass wafer (prepared as described above) at 125° C. for one-half hour, spun-coated as before with photoresist, and baked again at 90° C. for one-half hour. Then, using conventional techniques, a second photographic mask is prepared having an array of donut-shaped masks. Since the cavity 36 may be 200 microns in diameter, for example, the corresponding donut-shaped mask in the cavity 36 may have an inner diameter of 140 microns and an outer diameter of 190 microns. The donut-shaped masks on the second photographic mask are then aligned with the cavity 36 in the glass wafer; and the mask and glass waver assembly is exposed, as before. The glass wafer is then, as before, developed and rinsed; and then baked at 90° C. for one-half hour. This leaves an unprotected, donut-shaped hole in the photoresist on the surface 30 of substrate 26 having an inner diameter of 140 microns and an outer diameter of 190 microns.

Using conventional vacuum deposition techniques, a layer of chrome 200 Angstroms thick is deposited on the entire glass wafer, followed by a layer of iron 800 Angstroms thick being deposited on the layer of chrome. The chrome helps the iron, which is the actual getter material, to adhere to the glass wafer. Then the glass wafer is placed in acetone and agitated with ultrasound. This removes the remaining photoresist and also removes the chrome and iron, but only the chrome and iron which were over said remaining portions of photoresist. Finally, the glass wafer is washed with detergent, rinsed with water, and dried.

The resulting getter structure comprises a donut-shaped ring of the deposited chrome and iron layers with an inner diameter of 140 microns and an outer diameter of 190 microns centered on the surface 30 of the substrate 26. The getter ring leaves a clear central portion 40 microns in diameter in the bottom of each cavity 36 through which light can pass.

The diaphragm 36 covering the cavity 36 may be formed from a silicon wafer 3 inches in diameter, about 0.018 inch thick and etch-stopped with $10^{20}$ boron atoms/$cc^3$ at a depth of 4.0 microns, as sold by Diffusion Technology, Inc., of Milpitas, Calif. 95035. Thus the silicon wafer comprises an etch-stopped layer 4.0 microns thick supported by a silicon substrate of much greater thickness.

The bonding procedure preferably utilizes an anodic bonding technique, as mentioned above, because glues and adhesives would be drawn into the relatively thin cavity by capillary action. The etch-stopped side of the silicon wafer is provided with a layer of silicon dioxide about 200 Angstroms thick. The silicon dioxide is formed on the wafer by baking it in an oven at 900° C. for one hour in order to increase the subsequent adhesion of the glass wafer to it, as described subsequently. Next, the glass and silicon wafers, which have been prepared as previously described, are cleaned with warm, soapy water; cleaned in an ultrasound bath for about 15 minutes; rinsed with water; rinsed with alcohol; cleaned with alcohol; rinsed with alcohol; and finally, air dried. The etch-stopped layer of the silicon wafer is then placed on and aligned with the surface of the glass wafer in which the cavity 36 has been formed to produce a silicon and glass wafer sandwich. The silicon and glass wafers are bonded together by first being placed in a conventional vacuum chamber with a positive electrode in electrical contact with the outer surface of the silicon wafer and with a negative electrode in electrical contact with the outer surface of the glass wafer; after which the vacuum chamber is evacuated to about $6 \times 10^{-6}$ torr for one hour. The silicon and glass wafer sandwich is then heated by a heater in the vacuum chamber to a temperature of 500° C., at which it is maintained. While the assembly is at this temperature, a bonding voltage is applied to the positive and negative electrodes. The bonding voltage is ramped from 0–800 VDC, maintained at 800 VDC for about 8–10 minutes until the bonding current is stabilized, and then turned off. At this time, the silicon and glass wafers are now bonded together with a fluid-tight seal, the silicon dioxide layer on the silicon wafer aiding in the bonding process. If getter rings have been formed in the cavity 36, the temperature of the now bonded silicon and glass wafer sandwich is maintained at 500° C. for an additional one-half hour to activate the getter rings. Next, the heater in the vacuum chamber is turned off; and when the silicon and glass wafer sandwich has cooled to about 300° C., the vacuum in the vacuum chamber is released. The bonded silicon and glass water sandwich is removed from the vacuum chamber when it has cooled to about 200° C.

After the silicon and glass wafer sandwich is removed from the vacuum chamber, 7–80% of the thickness of the silicon substrate of the silicon wafer is removed by mechanical polishing. Next, an EDP etchant solution is prepared composed of 8 ml of water, 17 ml ethylenediamine, and 3 g pyrocatechol. The EDP etchant solution is heated to approximately 115° C. and used to chemically etch the pure silicon substrate away, leaving only its etch-stopped layer, about 4.0 microns thick, which is bonded to the glass wafer that forms the substrate 26. The 4.0-micron thickness is determined by periodically checking the thickness of the silicon remaining during the etching process, such as by measuring light transmission through the silicon.

As mentioned above, a light-reflecting coating is preferably applied to the surface 30 of substrate 26 and the inner surface 38 of the diaphragm 34. A light-absorbing coating is also preferably applied to the outer surface of diaphragm 34 and surface 104 (FIG 8) of substrate 100. The light-absorbing coating may be formed by using conventional vacuum deposition techniques to deposit two or more alternating layers of chrome and silicon on the outer surface of the diaphragm 34. A layer of chrome about 25 Angstroms thick is first deposited, followed by a layer of silicon about 100 Angstroms thick. The purpose of the light-absorbing coating is to prevent external light from entering cavity 36 through diaphragm 34 and to prevent light transmitted through the cavity 36 into diaphragm 34 from reentering the cavity 36 from the diaphragm structure 34. The reflective coating may be a material having a high refractive index, such as $TiO_2$.

Figures 10, 11:
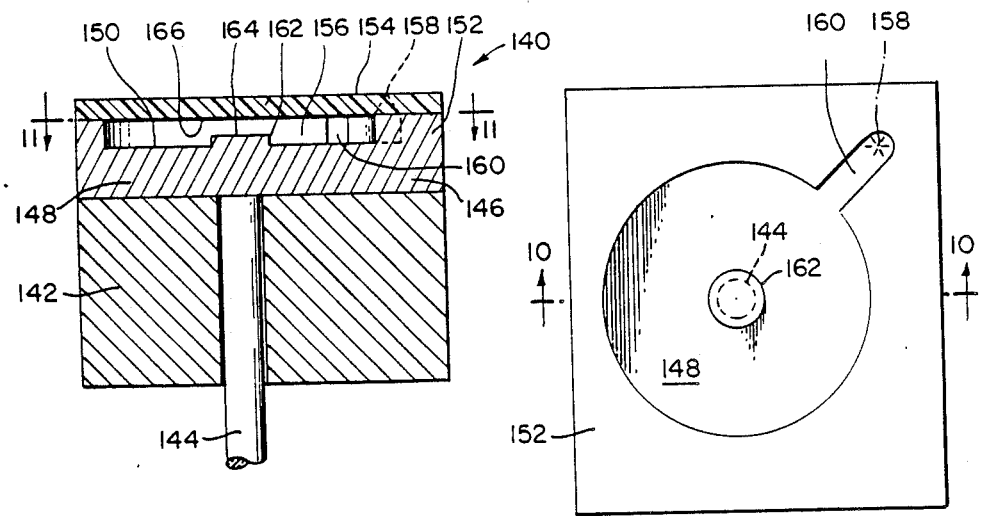
FIG. 10 is a cross-sectional view of an optical pressure sensor specially adapted for use as a microphone.
FIG. 11 is a cross-sectional view taken along the line 11—11 of FIG. 10.

The optical pressure sensor can be specially adapted for use as a microphone to respond to variations in pressure occurring at audio frequencies. One embodiment of an optical microphone employing an optically resonant cavity is illustrated in FIGS. 10 and 11. As with the embodiment of FIGS. 1 and 2, the microphone 140 includes a support 142 through which a conventional fiberoptic waveguide 144 extends. A substrate 146 is mounted on the support 142, with its lower surface contacting the end of the fiberoptic waveguide 144. The substrate 146 includes a base 148 having an inside surface 150 surrounded by sidewalls 152. A resilient diaphragm 154 is bonded to the sidewalls 152 in the manner described above with reference to the differential pressure sensor of FIGS. 8 and 9. The substrate 146 and diaphragm 154 together form an airtight cavity 156. The cavity 156 communicates with an external vent 158 through a radial projection or extension 160 of the cavity 156 in the same manner as described above with reference to FIGS. 8 and 9. For the reason explained below in greater detail, a pedestal 162 projects upwardly from the surface 150 of the substrate 146 into the cavity 156. The pedestal 162 has a planar surface 164 that is spaced close to the inside surface 166 of the diaphragm 154.

It has been found that a pressure sensor such as illustrated in FIG. 1 is not sufficiently sensitive for use as a microphone. This lack of sensitivity exists because diaphragm movement compresses the air inside the cavity, thus, in fact, making it a spring that restrains the deflection of the diaphragm. In order to improve sensitivity, the cavity must be vented through projection 160 and vent 158, thereby allowing relatively free movement of the diaphragm 154. However, the design of the venting structure is somewhat critical. If the vent too easily couples pressures waves into the cavity 156, the pressure waves will be received equally on opposite sides of the diaphragm 154. Under these circumstances, the diaphragm 154 will not deflect responsive to such pressure waves. If, however, the vent structure does not allow sufficient coupling of a pressure wave to the cavity 156, then it is effectively absent, thus reducing sensitivity.

Even if the pressure sensor of FIG. 1 was provided with a vent, sensitivity can be unacceptable because the optical properties of the sensor require that the spacing between the inner surface of the substrate and the inner surface of the diaphragm be very small. Since, for best optical performance, the thickness of the resonant cavity should be about one micrometer, movement of the vent air through the cavity can be restrictedd by this small dimension. In fact, viscous flow forces resulting from the small thickness of the cavity are the limiting factor in the high end frequency response of a pressure sensor. In order for the microphone 140 of FIGS. 10 and 11 to have a frequency response that extends well up into the audio range, it is necessary for the thickness of the cavity 156 to be large enough to allow the free flow of vent air in the cavity 156. However, a thick cavity 156 does not provide adequate optical performance. In order to achieve the good optical performance of a thin resonant cavity 156, while also achieving the good pneumatic performance of a thick optical cavity 156, most of the cavity 156 is made relatively deep to minimize the viscous flow forces opposing movement of the vent air. However, the pedestal 162, with its planar surface 164, is spaced sufficiently close to the surface 166 of the diagphragm 154 to provide good spectral modulation performance. Since the pedestal 162 occupies only a small portion of the cavity 156, it does not impede the flow of vent air through the cavity 156.

It has been found that the sensitivity of the microphone is relatively low for large spacings between the surface 164 of the pedestal 162 and the surface 166 of the diaphragm 154. As pedestal/diaphragm clearance is decreased, microphone sensitivity increases and then once again decreases as the pedestal/diaphragm clearance approaches zero. The optimum pedestal/diaphragm clearance is generally equal to on the order of several wavelengths of light from the light source 10. The microphone illustrated in FIGS. 10 and 11 is fabricated in substantially the same manner as described above with reference to the differential pressure sensor of FIGS. 8 and 9.

In order to ensure a frequency response extending to at least 10 KHz, the cavity may have a diameter of less than 1 millimeter and a thickness of about 1.5 micrometers.

The embodiment of the pressure sensor illustrated in FIG. 1 may also be used as a gas density sensor. "Gas density" is defined as the number of gas molecules per volume, independent of such factors as pressure and temperature. In some industrial processes, it is important to measure gas density. For example, in electrical switch gear or electrical transmission lines, an insulating gas (typically $SF_6$) is used as an insulator. As the temperature increases, the gas pressure in the closed vessel containing this gas increases. As the temperature decreases, the gas pressure decreases correspondingly. Conventional gas density monitoring equipment must measure both pressure and temperature and then interrelate these two physical parameters to each other to sense a reduction in gas density resulting from a leak in the vessel. The inventive optical pressure sensor can be used to sense the density of gas directly in a manner that is insensitive to the temperature of the gas.

The inventive gas density sensor is based on filling a small optically resonant cavity with a gas. The cavity is, in part, formed by a resilient diaphragm so that the diaphragm deforms responsive to the number of molecules per volume (nor pressure) in a closed container that contains the same gas that is inside the optically resonant cavity. The pressure sensor 18 (FIG. 1) can be modified for use as a gas density sensor. The pressure sensor 18 is placed in a closed vessel containing the gas whose density is to be measured, and the cavity 36 of the sensor 18 is filled with the same gas being monitored. Moreover, the pressure of the gas in the cavity 36 at a given temperature is made equal to the pressure of the gas in the vessel at that same temperature. Thus, as the temperature in the vessel containing the gas increases, the gas in the optical resonator cavity 36 increases accordingly. As a result, the differential pressure across the diaphragm 34 remains at zero. However, if a leak in the vessel occurs, the density of the gas in the vessel decreases, thereby decreasing the pressure outside of the cavity 36, which causes the diaphragm 34 to bow outwardly. The increased thickness of the cavity 36 then produces a microshift of the reflectivity curve which is sensed by the light detector 22, as explained above.

The operation of the gas density sensor can be understood by assuming that the diaphragm 34 is very thin and that diaphragm stiffness is negligible. If the internal gas fill pressure of the sensor 18 exactly matches the pressure of the monitored volume, the diaphragm 34 will be flat. As temperature changes, the internal and monitored pressure will both change keeping the diaphragm 34 flat. If a leak in the monitored volume does occur, the diaphragm position will change, reflecting a change in the monitored gas density.

An important feature of this gas density sensor is that, in addition to having the same gas in the cavity 36 and in the monitored volume, it can operate with different gases inside the cavity 36 and in the sensed volume. Additionally, it can operate without a significant temperature coefficient even with different gas pressures in the cavity and sensed volume.

The change in volume for a gravity covered by a diaphragm is:

$$\Delta V = \frac{\pi \Delta P (1 - 1/m^2) a^6}{16 E t^3} \quad \text{(Equation 1)}$$

where:
$\Delta P = P_e - P_i$, differential pressure
$P_e$ = external pressure
$P_i$ = internal pressure
m = inverse of Poisson's ratio
a = diaphragm radius
E = Young's modulus of diaphragm
t = diaphragm thickness
Initial cavity volume is:

$$V_o = a^2 h + \frac{\pi \Delta P_o (1 - 1/m^2) a^6}{16 E t^3} \quad \text{(Equation 2)}$$

where:
h = cavity depth
Po = initial differential pressure

With no gas leaks, as temperature changes, the pressure external to the cavity will change as dictated by the ideal gas law.

$$P_e = P_o T_i/T_o \quad \text{(Equation 3)}$$

where:
Po = initial external pressure
To = initial temperature
Ti = new temperature
the internal cavity pressure will become:

$$P_i = (P_s T_i/T_o)/(1 + (\Delta V/V_o)) \quad \text{(Equation 4)}$$

where: Ps = initial "set" pressure for cavity gas

At this point it can be seen that for Ps = Po, $\Delta V = 0$ for all values of temperature. That is for a fill pressure equal to the external pressure, no diaphragm deflection is experienced for any temperature. This is because the pressures on both sides of the diaphragm rise and fall identically with temperature.

If Po $\neq$ Ps an initial deflection exists:

$$\Delta V_o = \frac{-\pi (P_o - P_s)(1 - 1/m^2) a^6}{16 E t^3} \quad \text{(Equation 5)}$$

when the temperature changes, volume of the cavity 36 can be obtained by solving the coupled equations (1), (3) and (4) above. With the assumption that the sensed volume is much larger than the sensor cavity 36, an expression can be obtained. To make a true gas density sensor (not a pressure sensor) the change in volume should be zero for any change in temperature. The change in volume can be made arbitrarily small by proper selection of sensor parameters. Because the fractional volume change is:

$$\frac{\Delta V}{V} \approx \frac{\pi (P_o - P_s)}{16} \cdot \left[ \frac{P_s (1 - 1/m^2) a^4}{E t^3 h} \right] \quad \text{(Equation 6)}$$

It can be seen that for a sensor with a thin diaphragm 34, shallow cavity, large radius, and high initial pressure, the volume change can be minimized. Evaluating the volume change for a 60° C. temperature range, it is found to be less than 1% for a gas density sensor with an etched silicon diaphragm with a 1 mm diameter.

The embodiments illustrated in FIGS. 1-10 utilize a fiberoptic waveguide that extends through a support and abuts the surface of the substrate mounted on the support. Although this technique will provide adequate performance, it nevertheless suffers from some limitations. With reference to FIG. 12, light traveling through fiberoptic waveguide 180 passes through a substrate 182 to an optical resonator cavity 184 formed by the substrate 182 and a diaphragm 186. Some of the light, shown as ray 188, is reflected from the resonant cavity 184 back into the fiberoptic waveguide 180. However, some of the light, shown as ray 190, is reflected away from the fiberoptic waveguide 180 and is lost, thereby reducing the sensitivity of the pressure sensor.

It has been found that the loss of light resulting from the phenomena illustrated in FIG. 9 can be reduced by utilizing a lens between the fiberoptic waveguide and the sensor, as illustrated in FIG. 13. In this embodiment, light from the fiberoptic waveguide 180 passes through a conventional lens 194 before striking the substrate 182. The focusing properties of the lens 194 minimize the light loss for two reasons. First, the lens 194 focuses the input light to the optimum area of the substrate 182. Second, the light-gathering capability of the lens maximimizes the amount of reflected light that reaches the fiberoptic waveguide 180.

The effectiveness of the light-coupling structure illustrated in FIG. 13 can be increased by increasing the number of lenses used in the light-coupling structure. For example, in the embodiment of FIG. 14, the fiberoptic waveguide 180 extends through a support 200 that is, in turn, mounted in a cylindrical housing 202. A lens 204 is also positioned in the cylindrical housing 202 by mounts 206. The housing 202 is connected to a second cylindrical housing 210 through threads 212. The second cylindrical housing 210 contains the substrate 182 and diaphragm 186 of the sensor, as well as a second lens 216 supported by mounts 218 between the first lens 204 and the substrate 182. As mentioned above, the use of two lenses maximizes the effectiveness of the coupling between the fiberoptic waveguide 180 and the substrate 182. Moreover, by mounting the lenses 204, 216 in separate, detachable housings 202, 210, the pressure sensor can be easily disconnected from the fiberoptic waveguide 180. This is particularly advantageous in applications where the sensor is fixedly secured to a larger piece of equipment, as in typical process control applications.

The use of the optical pressure sensor in a process control application is illustrated in FIG. 15. In this embodiment, a liquid flows within a pipe 230. A smaller pipe 232 projects from pipe 230 at 90 degrees. A combination sensor and lens assembly 234 is mounted inside the pipe 232 and bonded thereto with an adhesive that provides good sealing characteristics in order to prevent the fluid in pipe 230 from escaping through pipe 232. The sensor/lens assembly includes a generally cylindrical support portion 236 surrounding an integrally formed lens 238 having a relatively high degree of curvature. A substrate 240 is mounted within the cylindrical support 236 adjacent the lens 238. A diaphragm 242 is bonded to the substrate 240 to form an optical resonator cavity 244.

Light from a beam splitter 14 (FIG. 1) is coupled through a fiberoptic waveguide 250 which extends into a termination piece 252 having a cylindrical portion 254 that is inserted into the pipe 232 and frictionally engages the inside surface of the pipe 232. A conventional graded refractive index lens 265 is mounted in the cylindrical portion 254. Light from the fiberoptic waveguide 250 shines through the graded refractive index lens 256 onto the lens 238, where it is focused to the optimum location on the substrate 240. The termination piece 252 may be removed from the pipe 232 by merely drawing the cylindrical portion 254 of the termination piece 252 out of the pipe 232. It has been found that the high curvature of the lens 238 reduces the amount of light that is reflected from the surface of the lens 238 back to the light detector 22 (FIG. 1) through the beam splitter 14. Light reflected back to the light detector 22 from any place other than the optical resonator cavity 244 represents a spurious response and can degrade the accuracy, sensitivity and other performance criteria of the pressure sensor.

The use of a lens 238 very close to the sensor also controls the numerical aperture of the light incident on the sensor. Although the phenomena is not entirely understood, bending the fiberoptic waveguide 250 causes light to leak from and couple between modes of the waveguide 250, particularly near the end of the waveguide. It has been found that controlling the numerical aperture can minimize these problems, known as "macrobend" effects. The optimum numerical aperture for reducing the macrobend effect has been found to be approximately ¾ of the numerical aperture of waveguide 250.

Figure 16:
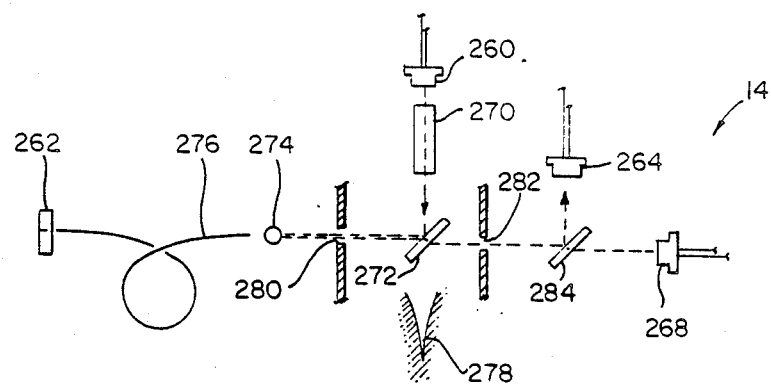
FIG. 16 is a schematic of a conventional beam splitter used with an optical sensor.

The beam splitter 14 (FIG. 1) may be implemented with a variety of components, such as the embodiment illustrated in FIG. 16. The beam splitter 14 receives input light from a conventional light-emitting diode 260, couples that light to an optical sensor 262, and couples the light reflected from the sensor 262 to a pair of photodiodes 264, 268. Input from the light-emitting diode 260 is applied to a graded refractive index lens, commonly known as a "SELFOC" lens 270, which has the property of, among other things, ensuring that the light leaving the lens 270 travels along the longitudinal axis of the lens 270. The light from the SELFOC lens 270 is incident on a partially reflecting, partially light-transmissive mirror 272 which couples a portion of the light to a ball lens 274 and then to the sensor 262 through a conventional fiberoptic waveguide 276. A portion of the light from the SELFOC lens 270 is also transmitted through the mirror 272 and is greatly attenuated in a light dump 278. As explained in greater detail below, the purpose of the light dump 278 is to prevent the beam splitter 14 from coupling input light from the LED 260 directly to the photodiodes 264, 268. If light is coupled from the light-emitting diode 260 to the photodiodes 264, 268, the sensitivity of the system to variations in the physical parameter being measured by the sensor 262 can be seriously degraded. The ball lens 274 also serves the function of minimizing the light coupled from the light-emitting diode 260 to the photodiodes 264, 268.

As light passes between the mirror 272 and ball lens 274, it passes through aperture 280. The aperture 280 serves two functions. First, it limits the numerical aperture of the light entering the fiberoptic waveguide 276 through ball lens 274 to minimize the macrobend effect, as described above. Second, it limits the effect of light that is backscattered from the ball lens 274, since only a small portion of the light backscattered by the ball lens 274 passes through the aperture 280.

Input light that is incident on the sensor 262 is reflected back through the fiberoptic waveguide 276 and ball lens 274 to the mirror 272. A portion of the light is reflected by the mirror 272 back to the SELFOC lens 270 and the light-emitting diode 260, but such light serves no function and, since it is of substantially lower intensity than the light from the light-emitting diode 260, does not adversely affect the performance of the system. The remaining portion of the output light reflected from the sensor 262 is transmitted through the mirror 272, through an aperture 282, and onto a partially reflective, partially light-transmissive mirror 284. The mirror 284 reflects part of the output light to photodiode 264 and transmits the remainder to photodiode 268. The light dump 278 minimizes the coupling of input light from LED 260 to the photodiodes 264, 268. If the light dump 278 did not absorb most of the light transmitted through the mirror 272, it would reflect light from the mirror 272 to mirror 284, which would then reflect such light to the photodiode 264 and transmit light to the photodiode 268. The light dump 278, by absorbing substantially all of the input light transmitted through the mirror 272, provides very little reflected light for the mirror 272 to reflect onto the mirror 284.

Most of what little light is reflected from the light dump 278 by the mirror 272 is further attenuated by the aperture 282. The aperture 282 allows only a small portion of the light reflected from the mirror 272 to reach the mirror 284 in the same manner that aperture 280 passes only a small portion of the light reflected from the ball lens 274. The light dump 278 and aperture 282 thus minimize the input light coupled to the photodiodes 264, 268. The light dump may be formed by converging surfaces coated with an epoxy that has been loaded with an absorber, such as graphite. Even though the surface is shiny, its reflection coefficient is only about 0.03. After many bounces, the light in the dump is attenuated to less than 1/10,000 of its initial power.

Figure 17:
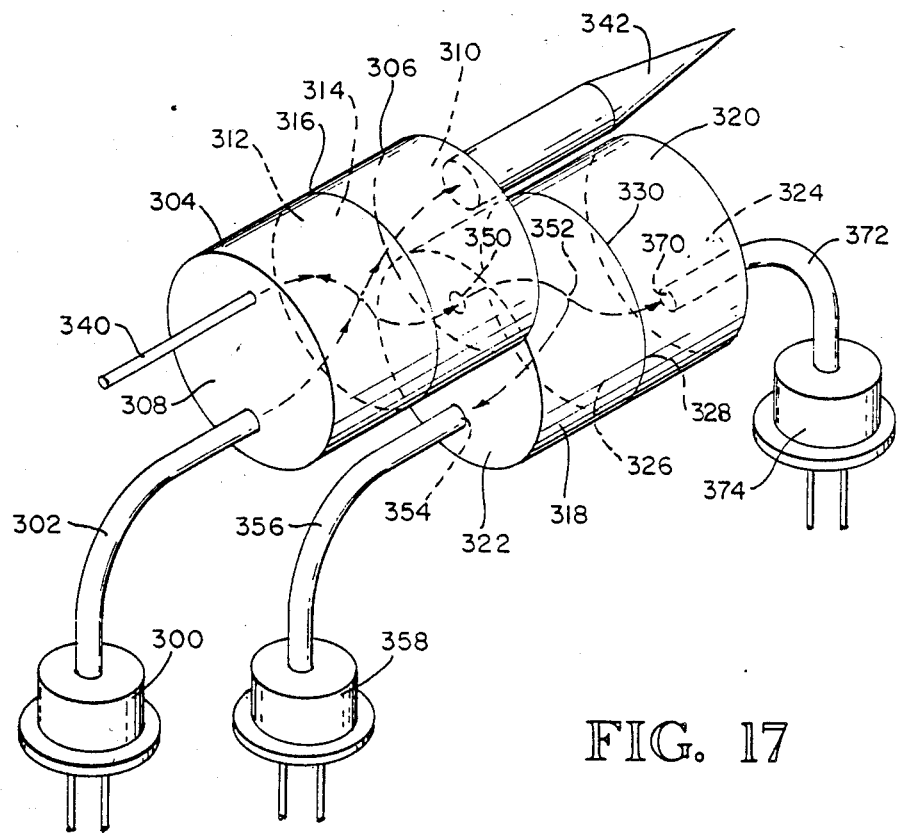
FIG. 17 is a schematic of a beam splitter using graded refractive index lenses.

The optical beam splitter, illustrated in schematic form in FIG. 16, can be implemented using SELFOC lenses, as illustrated in FIG. 17. Light from a light-emitting diode 300 is coupled through a fiberoptic waveguide 302 to a first pair of graded refractive index or SELFOC lenses 304, 306. The lenses 304, 306 each have a surface 308, 310 that is substantially exposed, as well as two opposed surfaces 312, 313 having a partially reflective, partially light-transmissive mirror 316 sandwiched therebetween. Similarly, a second pair of SELFOC lenses 318, 320 each have respective exposed surfaces 322, 324 and opposed surfaces 326, 328 abutting opposite surfaces of a dichroic mirror 330. The dichroic mirror has the property of reflecting light having wavelengths above or below a predetermined value while passing all other light.

The SELFOC lenses 304, 306, 318, 320, shown in FIG. 17, are "quarter-pitch" lenses which when arranged in pairs, have the property of coupling light incident on one surface to the opposite surface at the same radial distance but offset 180 degrees. Thus, light from LED 300 incident on the exposed surface 308 of SELFOC lens 304 is reflected by mirror 312 to fiber 340 which is the same distance from the center as fiberoptic waveguide 302, but offset 180 degrees.

Light which passes from fiber 302, through point 322 and into SELFOC lens 306 strikes surface 310 at a point which is the same radial distance from the center as fiberoptic waveguide 302, but offset 180 degrees. This light is essentially absorbed in the light dump 342. To assure minimum light reflection from the interface 310 and the light dump 342 the dump is fabricated from a material which has essentially the same refractive index as the SELFOC lens 306 at the radial distance where it is affixed to SELFOC lens 306. The light dump 342 serves the same function as the light dump 278 in the embodiment of FIG. 13, i.e., to prevent input light from being reflected onto mirror 312 and then to the light detectors. The light reflected from mirror 316 is coupled to an optically resonant sensor (not shown) through a conventional fiberoptic waveguide 340.

Output light reflected from the optically resonant sensor is coupled through fiberoptic waveguide 340 to the exposed surface 308 of SELFOC lens 304. It is then deflected as it travels towards the mirror 316 so that it is incident on the mirror 316 at the same point 332 as the light reflected from the light-emitting diode 300. The output light from waveguide 110 is then deflected in the SELFOC lens 306 to the point 350 on the exposed surface 310 of SELFOC lens 306. Output light from point 350 is then incident on the exposed surface 322 of SELFOC lens 318 and is coupled to point 352 on the dichroic mirror 330. A portion of the light is then reflected back through SELFOC lens 318 and deflected to emerge at point 354. This light is coupled through conventional fiberoptic waveguide 356 to a conventional photodetector 358. Since the dichroic mirror 330 is wavelength selective, a portion of the light incident on point 352 is transmitted through the dichroic mirror 330 and through the SELFOC lens 320 while being displaced to point 370 on exposed surface 324. This light is coupled through a conventional fiberoptic waveguide 372 to a photodetector 374.

In the past, optical beam splitters utilizing SELFOC lenses have utilized two pairs of SELFOC lenses 304, 306 and 318, 320, respectively, with their points 350 interconnected by a conventional fiberoptic waveguide. However, such configurations have not achieved the desired performance. It has been discovered that one of the reasons why such configurations have not achieved the desired performance is that it is difficult to match the refractive index of the SELFOC lenses 306, 318 with the refractive index of the fiberoptic waveguide joining the points 350 on the exposed surfaces 310, 322. Furthermore, the index of refraction of SELFOC lenses continuously varies radially from the center of the lens to its periphery. This makes matching of the lenses 306, 318 to a fiberoptic waveguide even more difficult. It is also difficult to align the longitudinal axes at the ends of the fiberoptic waveguides with the path of the light at points 350 of exposed surfaces 310, 322. By utilizing two pairs of SELFOC lenses, 304, 306 and 318, 320, and positioning the exposed surfaces 310, 322 in abutting relationship, the points 350 on both exposed surfaces 310, 322 are inherently symmetrical, thus ensuring that the refractive index of lens 306 at point 350 matches the refractive index of lens 318 at point 350, and further, that the path of the light from lens 306 to lens 318 is in proper alignment. Finally, the resulting optical beam splitter is a single solid assembly that minimizes optical noise due to vibration. In the past, it has not been recognized that fiberoptic waveguides could not properly be used to interconnect pairs of SELFOC lenses used as beam splitters in order to achieve optimum performance. Perhaps for this reason, it has not been recognized that joining two pairs of SELFOC lenses directly to each other would achieve superior performance.

It is thus seen that the beam splitter of FIG. 17 performs not only the function of the beam splitter 14 of FIG. 1, but it also performs the functions of the beam splitter 50, short-pass and long-pass filters 52, 60, and photodetectors 54, 62 of the embodiment of FIG. 4. The beam splitter of FIG. 17 is thus particularly adapted to a ratiometric light detection system.

Figure 18:
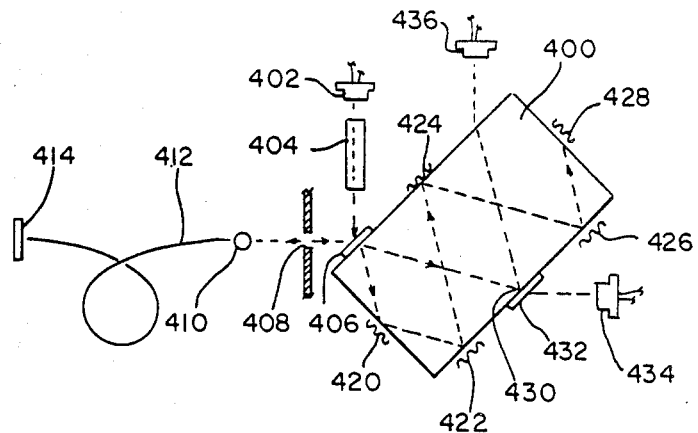
FIG. 18 is a schematic of a beam splitter utilizing a transparent block.

The optical beam splitter, illustrated schematically in FIG. 16, can also be implemented utilizing a transparent block 400, such as one fabricated of glass, as illustrated in FIG. 18. Input light from LED 402 is applied to a SELFOC lens 404, which generates a collimated beam of light that is incident on a partially reflective, partially light-transmissive mirror 406 formed on a edge of block 400. A portion of the input light is reflected by mirror 406 through an aperture 408 onto a ball lens 410. The ball lens 410 focuses the input light onto the end of a conventional fiberoptic waveguide 412, which couples the input light to an optically resonant sensor 414. As with the embodiment of FIG. 16, the aperture 408 and ball lens 410 select the numerical aperture of the light injected into the fiberoptic waveguide 412 in order to minimize macrobending effects. The numerical aperture is selected to be approximately 0.2. The ball lens 410, in conjunction with the aperture 408, also serves to minimize input light backscattered onto the mirror 406.

A portion of the input light from light-emitting diode 402 that is incident on mirror 406 is transmitted through mirror 406 into the interior of the transparent block 400. This light tends to be reflected from a series of edges of the block 400. At each area where input light is incident on the edge of the block, the edge of the block is provided with a light-absorptive coating 420-428. This absorptive coating 420-428 serves the same function as the light dump 278 of FIG. 16 and 342 of FIG. 17. It is particularly effective (reflectivity <1%) because of the good index match for an internal reflection from glass to common eposy adhesives.

Output light reflected from the sensor 414 is coupled through fiberoptic waveguide 412 and ball lens 410 to the mirror 406 through aperture 408. A portion of the light incident on mirror 406 is transmitted through the mirror 406 into the transparent block 400 to one edge at area 430. A long-pass filter 432 is mounted on the edge of block 400 at this point so that light reflected from sensor 414 and transmitted through mirror 406 having a wavelength above a predetermined value is transmitted through the mirror 432 to a photodiode 434. The remaining output light transmitted through mirror 406 is reflected by the long-pass filter 432 through the opposite edge of the transparent block 400 to the photodiode 436. The embodiment of FIG. 18, like the embodiment of FIG. 17, thus functions as not only the beam splitter 14 of FIG. 1, but also as the beam splitter 50, short wavelength and long wavelength filters 52, 60, and photodiodes 54, 62 of FIG. 4.

Figure 19:
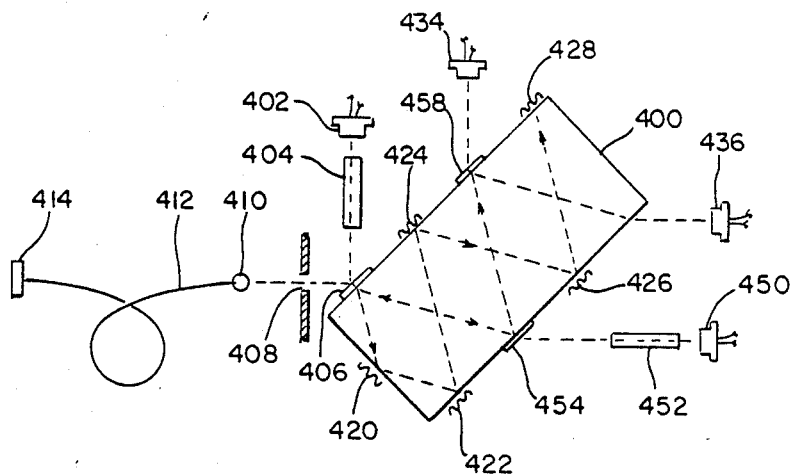
FIG. 19 is a schematic showing another embodiment of a beam splitter utilizing a transparent block.

The embodiment of FIG. 18 can be extended to provide input light having two distinct wavelengths, each of which is coupled to a respective photodiode utilizing the embodiment of FIG. 19. Since the embodiment of FIG. 19 utilizes many of the same components operating in the same manner as the embodiment of FIG. 18, these identical components have been given identical reference numerals for the purpose of brevity. The embodiment of FIG. 19 utilizes a second light-emitting diode 450, which is coupled through a SELFOC lens 452 to a partially reflective, partially light-transmissive mirror 454. A portion of the light is reflected by mirror 454 to a light dump (not shown) so that it does not affect the operation of the system. The remaining light from light-emitting diode 450 is transmitted through the mirror 454 into the interior of transparent block 400 and then through mirror 406, where it combines with light from light-emitting diode 402 reflected from mirror 406. The input light at these two wavelengths is then coupled to the optically resonant sensor 414. Sensor 414 reflects the input light having a reflectivity curve depending upon the optical parameter being sensed. This reflected light is transmitted through mirror 406 to mirror 454, which reflects at least a portion to a long-pass filter 458. Long-pass filter 458 transmits light derived from light-emitting diode 450 to the photodiode 434 and reflects the light derived from light-emitting diode 402 to the photodiode 436. The embodiment of FIG. 19 can be used to implement the ratiometric system utilizing input light having two distinct wavelengths.

A number of the sensors described above can be placed near one another to provide a larger sensing range than a single sensor can cover. For example, pressure sensors with different diameters can be used to cover a pressure range that extends from very low (the large diameter sensor diaphragm) to high (small diameter sensor). If these sensors are placed on a window, they can be observed by eye. The apparent color then is an indication of the diaphragm displacement, and hence the sensed parameter. To simplify this extended range sensor arrangement, a single sensor which has a wedge-shaped, constant depth cavity can be used. Where the walls of the cavity are close to one another, the sensor has the characteristics of a small diameter sensor with similar diaphragm thickness and cavity depth. Where the walls are farther apart, away from the point of the wedge, the sensor has the characteristics of a large diameter sensor.

This sensor concept is expected to have applications in monitoring of pressure, gas density, and other parameters of inexpensive sealed containers such as batteries that depend on internal pressure for performance. Depending on the application, appropriate lens systems can be used to deliver light to the sensor and collect reflected (wavelength modulated) light from the sensor.

It is thus seen that the optically resonant sensing system utilizes a number of novel components that allow optically resonant sensors to be used for new applications and which provide optimum performance for optically resonant sensors.

We claim:

1. An optical pressure-sensing system, comprising:
   an airtight, optical resonator cavity formed by a substrate having a transparent base with a planar inner surface, a resilient diaphragm and a sidewall extending between said substrate and diaphragm to surround said cavity, said diaphragm having a planar inner surface facing the inner surface of said substrate, the distance between the inner surfaces of said base and diaphragm being selected so that light having a predetermined wavelength resonates in said cavity;
   a light source generating light having at least one wavelength on a resonant cycle of said optical resonator;
   a light detector; and
   an optical system conveying light from said light source to the outer surface of the base of said substrate and the from the outer surface of the base of said substrate to said light detector so that light entering said cavity resonates at a frequency that is a fraction of the distance between the planar inner surfaces of said diaphragm and substrate, said light detector generating an electrical signal corresponding to a characteristic of the optically resonant frequency of said cavity, whereby the electrical output of said light detector varies as a function of the deflection of said diaphragm, resulting from the pressure differential across said diaphragm.

2. The optical pressure-sensing system of claim 1, further including a layer of reflective material coating the planar inner surface of said base.

3. The optical pressure-sensing system of claim 1 wherein said pressure sensor is specifically adapted to sense the density of a gas, said pressure sensor further including a gas filling said airtight cavity, said gas having a predetermined pressure at a predetermined temperature corresponding to the pressure of a gas being measured at a predetermined density and temperature.

4. The optical pressure-sensing system of claim 1 wherein the distance between the planar inner surface of base and the planar inner surface of said disphragm varies at different areas of said diaphragm thereby increasing the operating range of said sensor.

5. The optical pressure-sensing system of claim 1 wherein the zero differential pressure distance between the inner surfaces of said diaphragm and the base of said substrate is on the order of one micrometer, and wherein said diaphragm is ionically bonded to the sidewalls of said substrate.

6. The optical pressure-sensing system of claim 1 wherein said pressure sensor is specifically adapted for use as a microphone to respond to variations in pressure occurring at audio frequencies, said pressure sensor further including a pedestal projecting axially toward said diaphragm from the planar inner surface of said base at a location where light is conveyed to said base through said fiberoptic waveguide system, said pedestal having a planar surface that is parallel to the planar inner surface of said diaphragm and spaced from said diaphragm by a distance that is substantially less than the space between the inner surface of said diaphragm and the inner surface of said base, said sensor further including a fluid conduit extending between the optical resonator cavity and an external pressure port.

7. The optical pressure-sensing system of claim 1 wherein both surfaces of said diaphragm are planar and wherein said sensing system further includes a second substrate including a base having a planar inner surface surrounded by sidewalls, said sidewalls being pneumatically sealed to or part of said diaphragm so that said diaphragm and substrate form a second airtight cavity.

8. The optical pressure-sensing system of claim 1, further including an optical beam splitter coupling light from a first port to a third port and from said third port to a second port, said first port communicating with said light source, said second port communicating with said light detector, and said third port communicating with the base of said substrate, whereby light from said light source is coupled to the base of said substrate and from the base of said substrate to said light detector.

9. The optical pressure-sensing system of claim 5, further including a fluid conduit extending between said optical resonator cavity and an external pressure port, said conduit being formed by a radial extension of said cavity projecting into said substrate sidewall and then to an external surface.

10. The optical pressure-sensing system of claim 9 wherein said base, sidewalls and airtight cavity are formed by a cylindrical recess in said substrate, and wherein said radial extension is co-planar with the inner surface of said base, said diaphragm overlying said radial extension to isolate said radial extension from the external environment, said fluid conduit further including a passage extending in an axial direction through said substrate from an external surface of said substrate to said radial extension, thereby allowing external fluid communication with said airtight cavity without interfering with the pressure-induced deflection characteristics of said diaphragm.

11. The optical pressure-sensing system of claim 6 wherein said base, sidewalls and airtight cavity are formed by a cylindrical recess in said substrate, and wherein said fluid conduit is formed by a radial extension of said recess that is co-planar with the inner surface of said base, said diaphragm overlying said radial extension to isolate said radial extension from the external environment, said fluid conduit further including a passage extending in an axial direction from said external pressure port to said radial extension.

12. The optical pressure-sensing system of claim 11 wherein said passage extends through said diaphragm at a location where said diaphragm overlies said sidewalls.

13. The optical pressure-sensing system of claim 7, further including a first fluid conduit communicating between said first airtight cavity and an external first pressure port, and a second fluid conduit communicating between said second airtight cavity and an external second pressure port, said fluid conduits being formed by respective radial extensions of each airtight cavity projecting into the respective sidewall and then to an external surface.

14. The optical pressure-sensing system of claim 7 wherein said fiberoptic waveguide system includes a length of fiberoptic waveguide and a lens mounted between one end of said waveguide and the base of said substrate, said lens having an axis that is coaxial with the axis of said waveguide and perpendicular to the planar inner surface of said substrate base, said lens focusing light from said waveguide onto the base of said substrate.

15. The optical pressure-sensing system of claim 13 wherein said bases, sidewalls and airtight cavities are formed by respective cylindrical recesses in said first and second substrates, said diaphragm overlying said radial extensions to isolate said radial extensions from the external environment, each of said fluid conduit further including a bore extending in an axial direction through the respective substrate from an external surface of said substrate to the respective radial extension, thereby allowing external fluid communication with said airtight cavities without interfering with the pressure-induced deflection characteristics of said diaphragm.

16. The optical pressure-sensing system of claim 13, further including a layer of reflective material coating the planar inner surface of the base of said first substrate and an anti-reflective material coating the surface of said diaphragm facing toward the base of said second substrate.

17. The optical pressure-sensing system of claim 14 wherein said lens is a short focal length lens having its center positioned on a line extending along the axis of said fiberoptic waveguide, thereby minimizing incident light reflected back from said lens.

18. The optical pressure-sensing system of claim 14, further including a second lens positioned between said first lens and the end of said fiberoptic waveguide, said second lens transforming light diverging from said fiberoptic waveguide into parallel rays that are incident on said first lens, said first lens and said substrate being mounted in a first housing, and said second lens and the end of said fiberoptic waveguide being mounted in a second housing, said first and second housings being detachable, connected to each other.

19. The optical pressure-sensing system of claim 18 wherein said second lens is a graded refractive index lens.

20. The optical pressure-sensing system of claim 8 wherein said optical system includes a first fiberoptic waveguide extending from said light source to said first port of said optical beam splitter, a second fiberoptic waveguide extending from said second port of said optical beam splitter to said light detector, and a third fiberoptic waveguide extending between said third port of said optical beam splitter and the base of said substrate, whereby light is coupled from said light source to the base of said substrate through said first and third fiberoptic waveguides and from the base of said substrate to said light detector through said third and second fiberoptic waveguides.

21. The optical pressure-sensing system of claim 8 wherein said light source generates light at a minimum of two wavelengths on a resonant cycle of said optical resonator, and wherein said light detector comprises:
   a second optical beam splitter having a first port receiving light from said second fiberoptic waveguide and coupling said light from its first port to second and third ports;
   a short wavelength pass filter receiving light from the second port of said second optical beam splitter, said filter passing light from said light source of at least one wavelength to a greater degree than light from said light source having longer wavelengths;
   a long wavelength pass filter receiving light from the third port of said second optical beam splitter, said filter passing light from said light source of at least one wavelength to a greater degree than light from said light source having shorter wavelengths;
   first and second photodetectors receiving light from said short and long wavelength pass filters, respectively, said photodetectors generating respective electrical outputs corresponding to the amplitude of the light received by said photodetectors; and
   a ratio detector receiving the electrical outputs from said first and second photodetectors and generating an electrical output corresponding to the ratio thereof, whereby the output of said ratio detector varies in amplitude according to the microshifts in the resonant frequency of said optical resonator responsive to variations in the differential pressure across said resilient diaphragm.

22. The optical pressure-sensing system of claim 8, further including a second light detector and a second light source emitting light having a range of wavelengths different from the range of wavelengths of the light emitted from said first light source, and wherein said optical beam splitter comprises a transparent rectangular block having first and second partially reflective, partially transmissive mirrors on respective opposed edges of said block, and wherein light from said first light source is directed onto said first mirror at an angle selected so that a portion of said light is reflected to the base of said substrate, and wherein light from said second light source is directed onto said second mirror from a position and at an angle that is colinear with the path of light from said first light source from said first mirror to the base of said substrate, whereby light from said second light source passes sequentially through said second and first mirrors, and wherein light from the base of said substrate is directed onto said first mirror so that at a least a portion of said light is transmitted through said first mirror into the interior of said block and is reflected from said second mirror on at least one of the edges of said block toward first and second exit ports in sequence, said first exit port being coated with a material selectively passing light having a range of wavelengths substantially corresponding to the range of wavelengths of the light emitted from said first light source and reflecting light having a range of wavelengths substantially corresponding to the range of wavelengths of the light emitted from said second light source, said first light detector being positioned adjacent said first exit port and said second light detector being positioned adjacent said second exit port, whereby said first light detector receives light from said first light source after being modulated by said optical resonator, and said second light detector receives light from said second light source after being modulated by said optical resonator.

23. The optical pressure-sensing system of claim 8 wherein said optical beam splitter comprises first and second pairs of graded refractive index lenses, each of which has a surface that is substantially exposed and an opposed surface that is symmetrically positioned with respect to a surface of the other lens of each pair, said opposed surfaces contacting opposite faces of a partially reflective, partially transmissive mirror so that light incident on the exposed surface of each lens is coupled to a symmetrically positioned location on the exposed surface of the other lens of each pair, an exposed surface of said first pair of lenses abutting an exposed surface of a lens in the second pair of lenses, whereby said first and third ports are formed on one non-abutting exposed surface of said first pair of lens at locations that are symmetrically positioned with respect to each other, and said second port is formed on the non-abutting exposed surface of said second pair of lenses at a location that corresponds to the location of said first port.

24. The optical pressure-sensing system of claim 8, further including a second light detector communicating with a fourth port of said optical beam splitter, said optical beam splitter coupling light from said third port to said fourth port.

25. The optical pressure-sensing system of claim 8 wherein said optical beam splitter comprises a transparent rectangular block having a partially reflective, partially transmissive mirror on at least a portion of one edge thereof, and wherein light from said light source is directed onto said mirror at an angle selected so that a portion of the light from said light source is reflected to the base of said substrate, and light from the base of said substrate is directed onto said mirror so that at least a portion of said light is transmitted into the interior of said block and is reflected from at least one of the edges thereof and through an exit port on one of said edges, said light detector being positioned adjacent said exist port so that light reflected through said exit port is directed onto said light detector.

26. The optical pressure-sensing system of claim 23, further including a light dump receiving light from the abutting exposed surfaces of said first pair of lenses at a location corresponding to the location of said third port, thereby reducing the light from said light source reflected to said first and second light sensors.

27. The optical pressure-sensing system of claim 24 wherein said optical beam splitter comprises first and second pairs of graded refractive index lenses, each of which has a surface that is substantially exposed and an opposed surface that is symmetrically positioned with respect to a surface of the other lens of each pair, said opposed surfaces contacting opposite faces of a partially reflective, partially transmissive mirror so that light incident on the exposed surface of each lens is coupled to a symmetrically positioned location on the exposed surface of the other lens of each pair, an exposed surface of said first pair of lenses abutting an exposed surface on the second pair of lens, whereby said first and third ports are formed on one non-abutting exposed surface of said first pair of lenses at locations that are symmetrically positioned with respect to each other, said second port is formed on the non-abutting exposed surface of said second pair of lenses at a location that corresponds to the location of said first port, and said fourth port is formed at the abutting exposed surface of said second pair of lenses at a location that corresponds to the location of said second port.

28. The optical pressure-sensing system of claim 27, further including a light dump receiving light from the abutting exposed surface of said first pair of lenses at a location corresponding to the location of said third port, thereby reducing the light from said light source reflected to said first and second light sensors.

29. The optical pressure-sensing system of claim 25, further including a reflective coating on the exterior of said block at each area in which light is reflected from said edge.

30. The optical pressure-sensing system of claim 25 wherein a portion of the light from said light source passes through said partially reflective, partially transmissive mirror and is reflected from at least one of the edges of said block, and wherein a light-absorptive coating is placed in the exterior of said block at each area in which light from said light source is reflected from said edge.

31. The optical pressure-sensing system of claim 25, further including an aperture and ball lens positioned in sequence in the light path from said mirror to the base of said substrate to control the numerical aperture of light coupled to the base of said substrate and to reduce the light backscattered to said light detector.

32. The optical pressure-sensing system of claim 25 wherein light transmitted from the base of said substrate into the interior of said block is further reflected through a second exit port on one edge of said block, and wherein said optical pressure-sensing system further includes a second light detector receiving light from said second exit port.

33. The optical pressure-sensing system of claim 32 wherein a dichroic reflective coating is placed on the exterior of said block at said first exit port so that light from said light source of one range of wavelengths is directed through said first exist port onto said first light detector and light from said light source having another range of wavelengths is reflected by the dichroic mirror at said first exit port through said second exit port and onto said second light detector.

34. The optical pressure-sensing system of claim 14 wherein said lens is mounted in a cylindrical housing having first and second cylindrical flanges projecting away from each other, said substrate being mounted in said first flange and the end of said fiberoptic waveguide being mounted in said second flange.

35. An optical pressure sensor, comprising:
an airtight, optical resonator cavity formed by a substrate having a transparent base with a planar inner surface, a resilient diaphragm and a sidewall extending between said substrate and diaphragm to surround said cavity, said diaphragm having a planar inner surface facing the inner surface of said substrate, the distance between the inner surfaces of said base and diaphragm being selected so that light having a predetermined wavelength resonates in said cavity;
a fluid conduit extending between said optical resonator cavity and an external pressure port, said conduit being formed by a radial extension of said cavity projecting into said substrate sidewall and then to an external surface.

36. The optical pressure sensor of claim 35 wherein said base, sidewalls and airtight cavity are formed by a cylindrical recess and wherein said radial extension is co-planar with the inner surface of said base, said diaphragm overlying said radial extension to isolate said radial extension from the external environment, said fluid conduit further including a passage extending in an axial direction through said substrate from an external surface of said substrate to said radial extension, thereby allowing external fluid communication with said airtight cavity without interfering with the pressure-induced characteristics of said diaphragm.

37. The optical pressure sensor of claim 35, further including a layer of partially reflective material coating the planar inner surface of said base.

38. An optical pressure sensor comprising:
a first substrate having a transparent base with a planar inner surface;
a resilient diaphragm having a planar inner surface, the distance between the inner surfaces of said base and diaphragm being selected so that said cavity forms an optical resonator;
a first sidewall extending between said base and diaphragm and, together with said base and disphragm, forming a first airtight cavity;
a second substrate;
a second sidewall extending between said second substrate and said diaphragm on the surface opposite the surface to which said first sidewall extends so that said diaphragm, second substrate, and second sidewalls form a second airtight cavity;
first and second fluid conduits communicating between respective first and second fluid ports and said first and second airtight cavities; and
means for determining the deflection of said diaphragm solely from the optical resonance in said first airtight cavity.

39. The optical pressure sensor of claim 38 wherein said first and second fluid conduits are formed by respective arms of each airtight cavity projecting into the respective sidewall and then to an external surface.

40. The optical pressure sensor of claim 39, further including a layer of partially reflective material coating the planar inner surface of the base of said first substrate and an anti-reflective material coating the surface of said diaphragm facing toward the base of said second substrate.

41. A microphone responding to variations in pressure occurring at audio frequencies, said microphone comprising:
a substrate having a transparent base;
a pedestal mounted on and projecting axially away from the base of said substrate at a location where light is adapted to be conveyed to said base, said pedestal having a planar surface;
a resilient diaphragm having a planar inner surface mounted over the planar surface of said pedestal, the distance between the inner surface of said diaphragm and the planar surface of said pedestal being selected to form an optical resonator therebetween;
a sidewall extending between said base and diaphragm to form an airtight, optically resonant cavity surrounded by said sidewall; and
a fluid conduit extending between said airtight cavity and an external pressure port.

42. The microphone of claim 41 wherein said base, sidewall and airtight cavity are formed by a cylindrical recess in said substrate, and wherein said fluid conduit is formed by a radial extension of said recess, said diaphragm overlying said radial extension to isolate said radial extension from the external environment, said fluid conduit further including a passage extending in an axial direction from said external pressure port to said radial extension.

43. The microphone of claim 42 wherein said passage extends through said diaphragm at a location where said diaphragm overlies said sidewalls.

44. A gas density sensor specifically adapted to sense the density of a gas in an enclosed vessel, said gas density sensor comprising:
- a substrate having a transparent base and a planar inner surface;
- a resilient diaphragm having a planar inner surface mounted over the inner surface of said base, the distance between the inner surfaces of said base and diaphragm being selected so that said cavity forms an optical resonator; and
- a sidewall extending between said base and diaphragm so that said base, diaphragm and sidewall form an airtight, optically resonant cavity, said airtight cavity being filled with a gas having a predetermined pressure at a predetermined temperature corresponding to the pressure of the gas in said vessel at a predetermined density.

45. The gas density sensor of claim 44, further including a layer of reflective material coating the planar inner surface of said base.

* * * * *